US008000067B1

(12) United States Patent
Jin et al.

(10) Patent No.: US 8,000,067 B1
(45) Date of Patent: Aug. 16, 2011

(54) METHOD AND APPARATUS FOR IMPROVING SUPPLY NOISE REJECTION

(75) Inventors: Xiaodong Jin, Sunnyvale, CA (US); Sehat Sutardja, Los Altos Hills, CA (US); Lawrence Tse, Fremont, CA (US); King Chun Tsai, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 890 days.

(21) Appl. No.: 10/811,031

(22) Filed: Mar. 26, 2004

Related U.S. Application Data (60) Provisional application No. 60/470,625, filed on May 15, 2003.

(51) Int. Cl.
*H02H 9/00* (2006.01)
(52) U.S. Cl. ........................................................ 361/56
(58) Field of Classification Search .................. 361/56
See application file for complete search history.

(56) References Cited

U.S. PATENT DOCUMENTS

| | | | | |
|---|---|---|---|---|
| 5,726,844 A | * | 3/1998 | Smith | 361/56 |
| 5,764,464 A | * | 6/1998 | Botker et al. | 361/56 |
| 5,852,541 A | | 12/1998 | Lin et al. | 361/111 |
| 5,994,760 A | * | 11/1999 | Duclos | 257/546 |
| 6,046,897 A | | 4/2000 | Smith et al. | 361/111 |
| 6,329,692 B1 | | 12/2001 | Smith | 257/360 |
| 6,576,958 B2 | | 6/2003 | Ker et al. | 257/355 |
| 6,738,248 B1 | * | 5/2004 | Jenkins et al. | 361/111 |

FOREIGN PATENT DOCUMENTS

WO    WO 0205380 A  *  1/2002

OTHER PUBLICATIONS

IEEE Computer Society, "*Information Technology—Telecommunications and Information Exchange Between Systems—Local and Metropolitan Area Networks—Specific Requirements—Part 11: Wireless LAN Medium Access Control (MAC) and Physical Layer (PHY) Specifications*", IEEE Std 802.11—First Edition, 1999.
IEEE Computer Society, "*Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: High-speed Physical Layer in the 5 GHZ Band*", IEEE Std 802.11a—1999 (Supplement to IEEE Std 802.11—1999).
IEEE Computer Society, "*Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Higher-speed Physical Layer Extension in the 2.4 GHZ Band*", IEEE Std 802.11b—1999 (Supplement to IEEE Std 802.11—1999).
IEEE Computer Society, "*IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment 7: Medium Access Control (MAC) Quality of Service (QoS) Enhancements*", IEEE P802.11e/D11.0, Oct. 2004.

(Continued)

*Primary Examiner* — Jared J Fureman
*Assistant Examiner* — Scott Bauer (57) ABSTRACT

An electrostatic discharge (ESD) circuit operable to protect an internal circuit from ESD events and protect the internal circuit from high-side supply noise.

18 Claims, 5 Drawing Sheets

OTHER PUBLICATIONS

IEEE Computer Society, "*IEEE Standard for Information Technology—DRAFT Supplement to Standard [for] Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Further Higher Data Rate Extension in the 2.4 GHz Band*", IEEE P802.11g/D8.2, Apr. 2003.

IEEE Computer Society, "*IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment 5: Spectrum and Transmit Power Management Extensions in the 5 GHz Band in Europe*", IEEE P802.11h—2003.

IEEE Computer Society, "*IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment 6: Medium Access Control (MAC) Security Enhancements*", IEEE Std 802.11i—2004.

IEEE Computer Society, "*IEEE Project 802.14/a Draft 3 Revisions 3—Cable-TV Access Method and Physical Layer Specification*", IEEE 802.14 Draft3 R3—Oct. 25, 1998.

* cited by examiner

METHOD AND APPARATUS FOR IMPROVING SUPPLY NOISE REJECTION

CROSS-REFERENCE TO RELATED APPLICATIONS

The present application claims priority to commonly assigned U.S. Provisional Patent Application No. 60/470,625, filed on May 15, 2003, which is incorporated herein by reference in its entirety.

BACKGROUND

Electrostatic discharge (ESD) can damage integrated circuits (ICs). ESD is caused when a source of electrostatic potential (e.g., a human body with a static buildup of charge carriers) comes into contact with a circuit input. The electrostatic voltage may damage sensitive ICs if the electrostatic voltage discharges through circuit elements. In order to prevent ESD damage to functional circuits on the IC, ESD protective circuits may be incorporated on the input/output (I/O) pads of the IC. The role of an ESD protection circuit is to ensure, that in case of an ESD event, the electrostatic potential is shunted (or diverted) to ground—i.e., the electrostatic potential can be discharged through the ESD protective circuits, protecting the IC's functional circuits.

Figure 1:
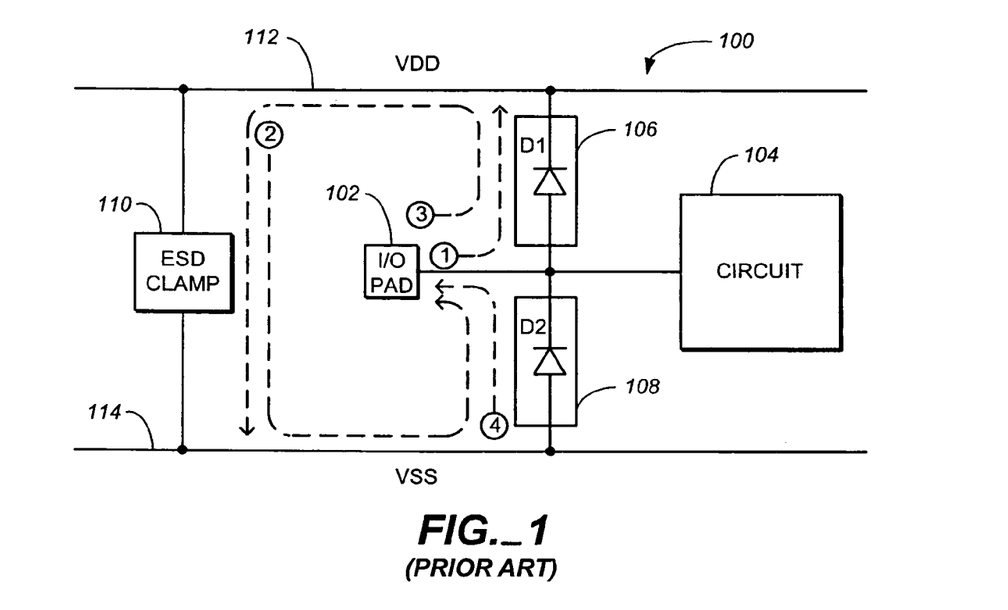
FIG. 1 illustrates a conventional ESD protection scheme for an IC.

FIG. 1 illustrates a conventional ESD protection scheme for an IC 100 including an I/O pad 102 and an internal circuit 104. The conventional ESD protection scheme includes ESD protection circuits 106, 108, and an ESD clamp 110. ESD protection circuits 106, 108 are typically formed by diodes (represented by D1 and D2 in FIG. 1). ESD protection circuit 106 couples I/O pad 102 to a high-side supply VDD 112, and ESD protection circuit 108 couples I/O pad 102 to a low-side supply VSS 114. ESD clamp 110 couples VDD 112 to VSS 114, and provides a discharge path between VDD 112 and VSS 114 during an ESD event.

There are four types of ESD events that can occur at I/O pad 102 with respect to VDD 112 and VSS 114. The four types of ESD events are:

(1) I/O pad 102 to VDD 112, positive discharge pulse: An I/O pad 102 to VDD 112 positive discharge pulse occurs when a positive ESD exerts stress on I/O pad 102 with VDD 112 relatively grounded. VSS 114 floats during an I/O pad 102 to VDD 112 positive discharge pulse. As discussed above, the role of an ESD protection circuit is to shunt ESD away from an IC's functional circuits. The I/O pad 102 to VDD 112 positive ESD is shunted away from internal circuit 104 as follows: ESD protection circuit 106 shunts ESD current (associated with the positive discharge pulse) from I/O pad 102 to VDD 112.

(2) I/O pad 102 to VDD 112, negative discharge pulse: An I/O pad 102 to VDD 112 negative discharge pulse occurs when a negative ESD exerts stress on I/O pad 102 with VDD 112 relatively grounded. VSS 114 floats during an I/O pad 102 to VDD 112 negative discharge pulse. The I/O pad 102 to VDD 112 negative ESD is shunted away from internal circuit 104 as follows: ESD clamp 110 shunts ESD current (associated with the negative discharge pulse) from VDD 112 to VSS 114. ESD protection circuit 108 shunts the ESD current from VSS 114 to I/O pad 102.

(3) I/O pad 102 to VSS 114, positive discharge pulse: An I/O pad 102 to VSS 114 positive discharge pulse occurs when a positive ESD exerts stress on I/O pad 102 with VSS 114 relatively grounded. VDD 112 floats during an I/O pad 102 to VSS 114 positive discharge pulse. The I/O pad 102 to VSS 114 positive ESD is shunted away from internal circuit 104 as follows: ESD protection circuit 106 shunts ESD current (associated with the positive discharge pulse) from I/O pad 102 to VDD 112. ESD clamp 110 shunts ESD current from VDD 112 to VSS 114.

(4) I/O pad 102 to VSS 114, negative discharge pulse: An I/O pad 102 to VSS 114 negative pulse occurs when a negative ESD exerts stress on I/O pad 102 with VSS 114 relatively grounded. VDD 112 floats during an I/O pad 102 to VSS 114 negative discharge pulse. The I/O pad 102 to VSS 114 negative ESD is shunted away from internal circuit 104 as follows: ESD protection circuit 108 shunts ESD current (associated with the negative discharge pulse) from VSS 114 to I/O pad 102.

The conventional ESD protection scheme described above can generally shunt potentially damaging electrostatic potential away from sensitive circuitry (e.g., internal circuit 104). One limitation of the conventional ESD protection scheme is a large parasitic capacitance that is typically associated with each of ESD protection circuits 106, 108. Such a large parasitic capacitance can couple noise appearing on VDD 112— i.e., high-side supply noise—through ESD protection circuit 106 to internal circuit 104, and adversely affect the performance and reliability of internal circuit 104.

SUMMARY

In general, in one aspect, this specification describes an electrostatic discharge (ESD) protection circuit for discharging ESD events. The ESD protection circuit includes an ESD protection circuit having a first and second terminal. The first terminal is coupled to an input/output (I/O) pad, and the second terminal coupled to a low-side supply (VSS). The ESD protection circuit is operable to shunt ESD current during positive and negative ESD events.

Particular implementations may include one or more of the following features. The ESD protection circuit can include circuit elements selected from the group consisting of polymer devices, metal oxide silicon (MOS) devices, and diodes. The ESD protection circuit can include two diodes that are in parallel and in opposite directions. The ESD protection circuit can not be directly coupled to a high-side supply (VDD). The ESD protection circuit can further include an ESD clamp to provide a discharge path between the high-side supply (VDD) and the low-side supply (VSS) during an ESD event. The positive and negative ESD events can include an I/O pad to high-side supply (VDD) positive discharge pulse, an I/O pad to high-side supply (VDD) negative discharge pulse, an I/O pad to low-side supply (VSS) positive discharge pulse, and an I/O pad to low-side supply (VSS) negative discharge pulse. The low-side supply (VSS) can float during the I/O pad to high-side supply (VDD) positive discharge pulse and the I/O pad to high-side supply (VDD) negative discharge pulse. The high-side supply (VDD) can float during the I/O pad to low-side supply (VSS) positive discharge pulse and the I/O pad to low-side supply (VSS) negative discharge pulse.

In general, in another aspect, this specification describes a method for discharging electrostatic discharge (ESD). The method includes receiving a positive or negative discharge pulse on an I/O pad, and shunting ESD current associated with the positive or negative discharge pulse from the I/O pad to a low-side supply (VSS) prior to shunting the ESD current to a high-side supply (VDD) for all the received positive and negative discharge pulses.

Particular implementations may include one or more of the following features. The positive discharge pulse can be an ESD event selected from the group consisting of an I/O pad to high-side supply (VDD) positive discharge pulse and an I/O pad to low-side supply (VSS) positive discharge pulse. If the positive discharge pulse is an I/O pad to high-side supply (VDD) positive discharge pulse, shunting ESD current can include shunting ESD current associated with the I/O pad to high-side supply (VDD) positive discharge pulse from the I/O pad to the low-side supply (VSS), then shunting the ESD current from the low-side supply (VSS) to the high-side supply (VDD). If the positive discharge pulse is an I/O pad to low-side supply (VSS) positive discharge pulse, shunting ESD current can include shunting ESD current associated with the I/O pad to low-side supply (VSS) positive discharge pulse from the I/O pad to the low-side supply (VSS).

The negative discharge pulse can be an ESD event selected from the group consisting of an I/O pad to high-side supply (VDD) negative discharge pulse and an I/O pad to low-side supply (VSS) negative discharge pulse. If the negative discharge pulse is an I/O pad to high-side supply (VDD) negative discharge pulse, shunting ESD current can include shunting ESD current associated with the I/O pad to high-side supply (VDD) Negative discharge pulse from the high-side supply VDD to the low-side supply (VDD), then shunting the ESD current from the low-side supply (VSS) to the I/O pad. If the negative discharge pulse is an I/O pad to low-side supply (VSS) negative discharge pulse, shunting ESD current can include shunting ESD current associated with the I/O pad to low-side supply (VSS) negative discharge pulse from the low-side supply VSS to the I/O pad.

In general, in another aspect, this specification describes a low noise amplifier (LNA). The LNA includes an RF input and an electrostatic discharge (ESD) protection circuit. The ESD protection circuit includes a first terminal coupled to an input/output (I/O) pad, and a second terminal coupled to a low-side supply (VSS). The ESD protection circuit is operable to shunt ESD current during positive and negative ESD events away from the RF input and through the low-side supply.

Particular implementations may include one or more of the following features. The low noise amplifier can be compliant with an IEEE standard selected from the group consisting of 802.11, 802.11a, 802.11b, 802.11e, 802.11g, 802.11h, and 802.11i, and 802.14.

An ESD protection scheme is provided that protects an internal circuit from high-side supply noise. The ESD protection scheme does not include an ESD protection circuit that couples the high-side supply to the internal circuit. Thus, there is not a direct path for any high-side supply noise to travel from the high-side supply to the internal circuit. The ESD protection scheme, therefore, provides a better rejection of high-side supply noise.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 2:
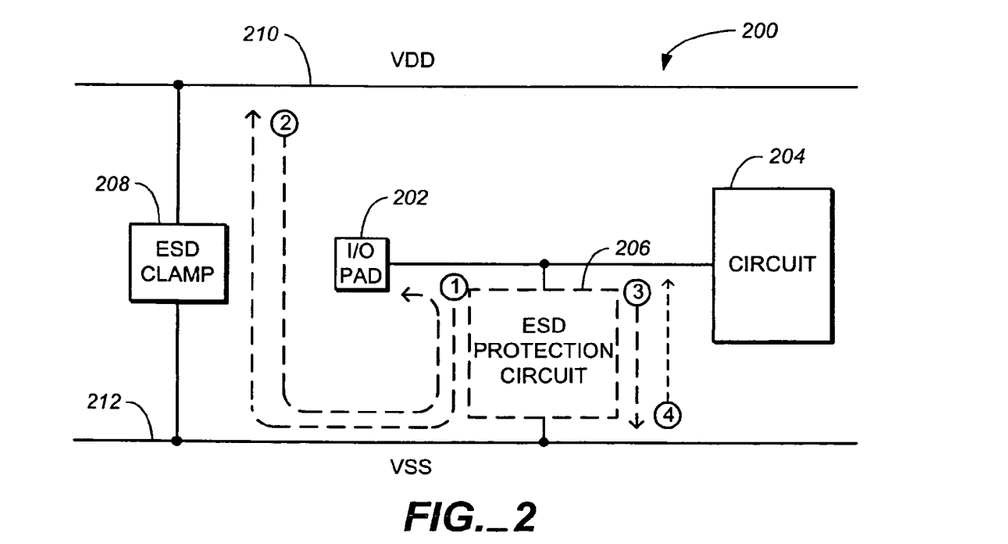
FIG. 2 illustrates an ESD protection scheme for an IC.

FIG. 2 illustrates an ESD protection scheme for an IC 200 including an I/O pad 202 and an internal circuit 204 that are both immune from high supply noise. The ESD protection scheme includes an ESD protection circuit 206 and an ESD clamp 208, to protect internal circuit 204 from ESD events. ESD clamp 208 couples a high-side supply (VDD 210) to a low-side supply (VSS 212) and provides a discharge path between VDD 210 and VSS 212 during an ESD event. ESD protection circuit 206 couples I/O pad 202 to VSS 212. As shown in FIG. 2, IC 200 does not include an ESD protection circuit to couple I/O pad 202 to VDD 210. Thus, there is not a direct path for any high supply noise (i.e., noise from VDD 210) to travel from VDD 210 to internal circuit 204.

ESD protection circuit 206 can be formed by polymer devices and/or metal oxide silicon (MOS) devices (e.g., transistors). ESD protection circuit can include diodes (e.g., regular diodes, Zener diodes, TVS (transient voltage suppression) diodes, MOVs (metal oxide varistors), silicon controlled rectifiers (SCRs), and so on), and be operable to shunt positive and negative ESD current away from internal circuit 204. More specifically, ESD protection circuit 206 provides the following functions upon occurrence of ESD events, as shown in FIG. 2.

(1) I/O pad 202 to VDD 210, positive discharge pulse: An I/O pad 202 to VDD 210 positive discharge pulse occurs when a positive ESD exerts stress on I/O pad 202 with VDD 210 relatively grounded. VSS 212 floats during an I/O pad 202 to VDD 210 positive discharge pulse. The role of ESD protection circuit 206 is to shunt ESD away from internal circuit 204. The I/O pad 202 to VDD 112 positive discharge pulse is shunted away from internal circuit 204 as follows: ESD protection circuit 206 shunts the ESD current (associated with the positive discharge pulse) from I/O pad 202 to VSS 212. ESD clamp 208 shunts the ESD current from VSS 212 to VDD 210.

(2) I/O pad 202 to VDD 210, negative discharge pulse: An I/O pad 202 to VDD 210 negative discharge pulse occurs when a negative ESD exerts stress on I/O pad 202 with VDD 210 relatively grounded. VSS 212 floats during an I/O pad 202 to VDD 210 negative discharge pulse. The I/O pad 202 to VDD 112 negative discharge pulse is shunted away from internal circuit 204 as follows: ESD clamp 208 shunts the ESD current (associated with the negative discharge pulse) from VDD 210 to VSS 212. ESD protection circuit 206 shunts the ESD current from VSS 212 to I/O pad 202.

(3) I/O pad 202 to VSS 212, positive discharge pulse: An I/O pad 202 to VSS 212 positive discharge pulse occurs when a positive ESD exerts stress on I/O pad 202 with VSS 212 relatively grounded. VDD 210 floats during an I/O pad 202 to VSS 212 positive discharge pulse. The I/O pad 202 to VSS 212 positive discharge pulse is shunted away from internal circuit 204 as follows: ESD protection circuit 206 shunts the ESD current (associated with the positive discharge pulse) from I/O pad 202 to VSS 212.

(4) I/O pad 202 to VSS 212, negative discharge pulse: An I/O pad 202 to VSS 212 negative discharge pulse occurs when a negative ESD exerts stress on I/O pad 202 with VSS 212 relatively grounded. VDD 210 floats during an I/O pad 202 to VSS 212 negative discharge pulse. The I/O pad 202 to VSS 212 negative discharge pulse is shunted away from internal circuit 204 as follows: ESD protection circuit 206 shunts the ESD current (associated with the negative discharge pulse) from VSS 212 to I/O pad 202.

Figure 3:
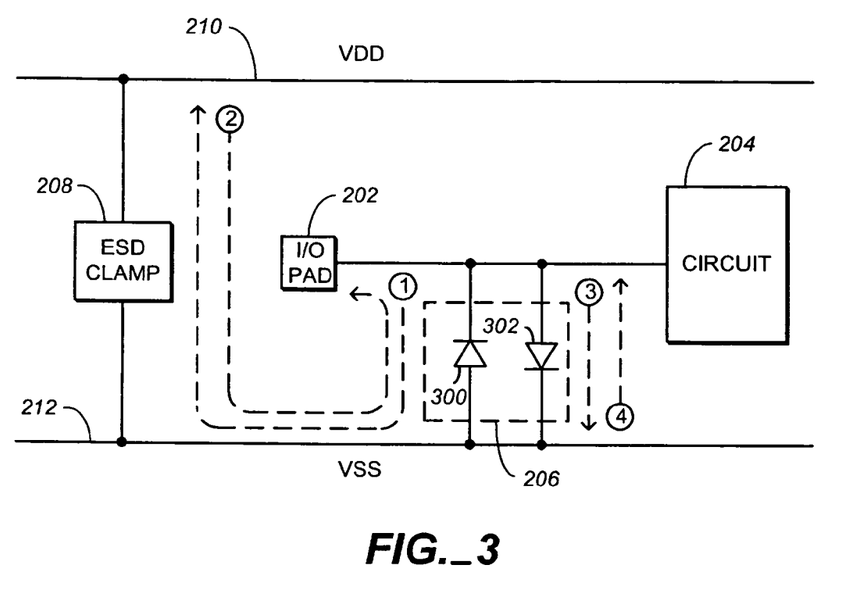
FIG. 3 illustrates an ESD protection circuit.

FIG. 3 illustrates an implementation of ESD protection circuit 206 formed by a first diode 300 and a second diode 302. As shown in FIG. 3, first diode 300 and second diode 302 are coupled in parallel, and in opposite directions, between I/O pad 202 and VSS 212. That is, first diode 300 has an anode and a cathode coupled to VSS 212 and I/O pad 202, respectively, and second diode 302 has an anode and a cathode coupled to I/O pad 202 and VSS 212, respectively. ESD protection circuit 206, formed by first diode 300 and second diode 302, protects internal circuit 204 from ESD events.

(1) I/O pad 202 to VDD 210, positive discharge pulse: As discussed above, an I/O pad 202 to VDD 210 positive discharge pulse occurs when a positive ESD exerts stress on I/O pad 202 with VDD 210 relatively grounded. VSS 212 floats during an I/O pad 202 to VDD 210 positive discharge pulse. Second diode 302 shunts the ESD current (associated with the positive discharge pulse) from I/O pad 202 to VSS 212. ESD clamp 208 shunts the ESD current from VSS 212 to VDD 210.

(2) I/O pad 202 to VDD 210, negative discharge pulse: An I/O pad 202 to VDD 210 negative discharge pulse occurs when a negative ESD exerts stress on I/O pad 202 with VDD 210 relatively grounded. VSS 212 floats during an I/O pad 202 to VDD 210 negative discharge pulse. The I/O pad 202 to VDD 112 negative discharge pulse is shunted away from internal circuit 204 as follows: ESD clamp 208 shunts the ESD current (associated with the negative discharge pulse) from VDD 210 to VSS 212. First diode 300 shunts the ESD current from VSS 212 to I/O pad 202.

(3) I/O pad 202 to VSS 212, positive discharge pulse: An I/O pad 202 to VSS 212 positive discharge pulse occurs when a positive ESD exerts stress on I/O pad 202 with VSS 212 relatively grounded. (VDD 210 floats during an I/O pad 202 to VSS 212 positive discharge pulse. The I/O pad 202 to VSS 212 positive discharge pulse is shunted away from internal circuit 204 as follows: Second diode 302 shunts the ESD current (associated with the positive discharge pulse) from I/O pad 202 to VSS 212.

(4) I/O pad 202 to VSS 212, negative discharge pulse: An I/O pad 202 to VSS 212 negative discharge pulse occurs when a negative ESD exerts stress on I/O pad 202 with VSS 212 relatively grounded. VDD 210 floats during an I/O pad 202 to VSS 212 negative discharge pulse. The I/O pad 202 to VSS 212 negative discharge pulse is shunted away from internal circuit 204 as follows: First diode 300 shunts the ESD current (associated with the negative discharge pulse) from VSS 212 to I/O pad 202.

Figure 4:
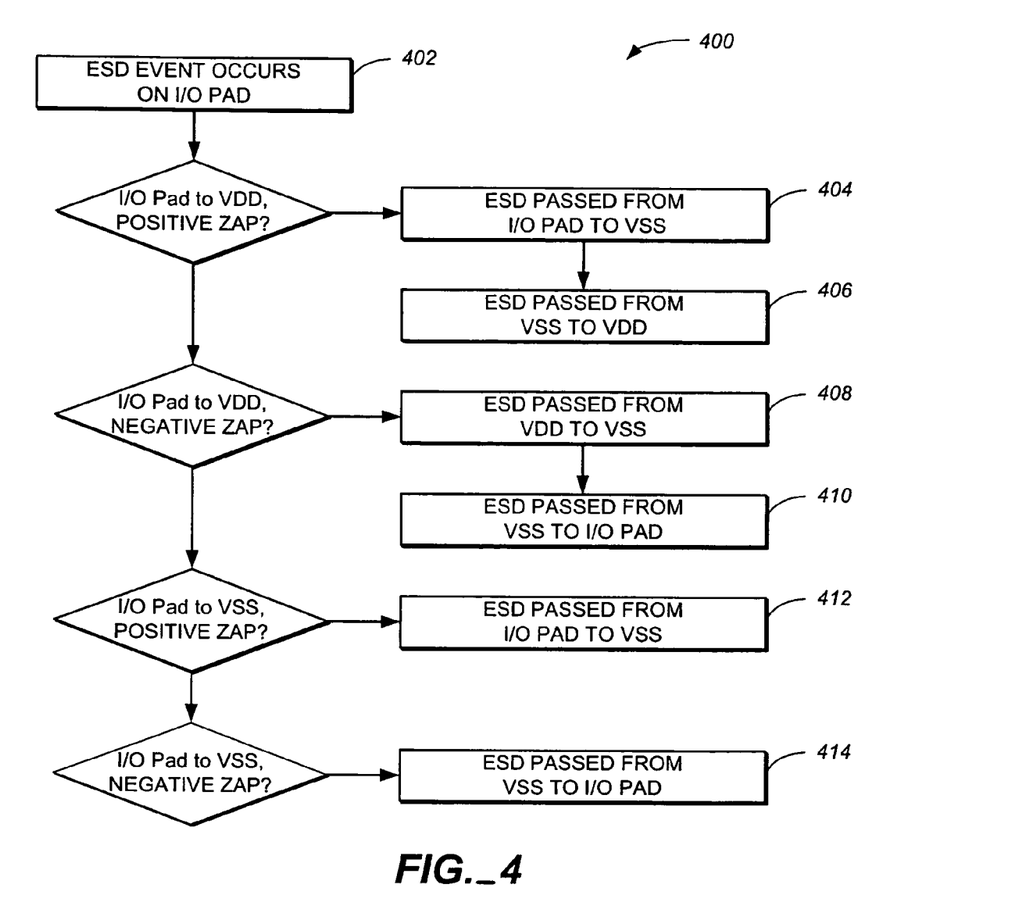
FIG. 4 is a flowchart of a process for discharging ESD.

FIG. 4 shows one implementation of a process 400 for providing an ESD protection scheme for an internal circuit. An ESD event occurs on an I/O pad (step 402). If the ESD event is an I/O pad to VDD, positive discharge pulse, ESD current is first directly shunted from the I/O pad to VSS through an ESD protection circuit (step 404). The ESD current is then directly shunted from VSS to VDD through an ESD clamp (step 406). If the ESD event is an I/O pad to VDD, negative discharge pulse, ESD current is first directly shunted from VDD to VSS through an ESD clamp (step 408). The ESD current is then directly shunted from VSS to the I/O pad through an ESD protection circuit (step 410). If the ESD event is an I/O pad to VSS, positive discharge pulse, ESD current is directly shunted from the I/O pad to VSS through an ESD protection circuit (step 412). If the ESD event is an I/O pad to VSS, negative discharge pulse, ESD current is directly shunted from VSS to the I/O pad through an ESD protection circuit (step 414).

Figure 5:
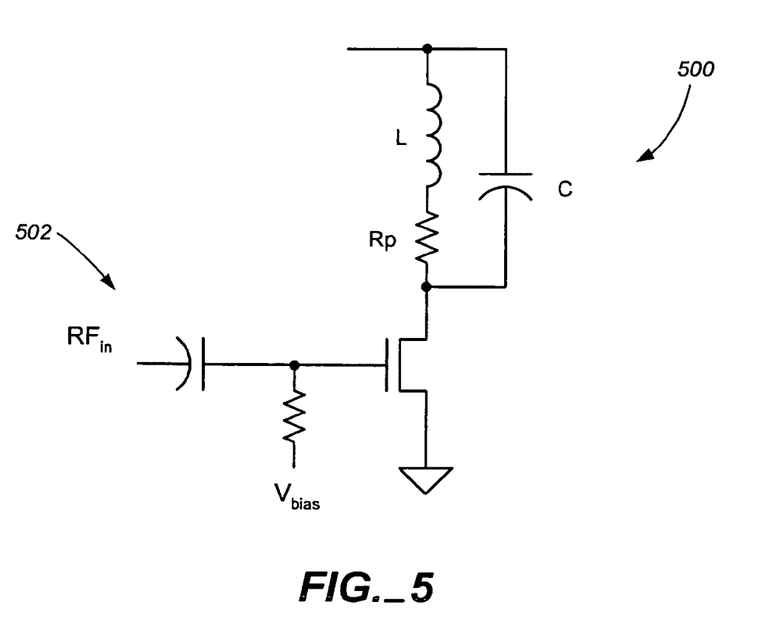
FIG. 5 is schematic diagram of a low noise amplifier (LNA).

The ESD protection scheme illustrated in FIGS. 2 and 3 can be used to protect a wide range of circuits, e.g., a low noise amplifier (LNA). A LNA is a critical building block of an RF transceiver which is sensitive to high-side supply noise. FIG. 5 shows an example of a conventional CMOS LNA 500. CMOS LNA 500 includes an RF input 502. CMOS LNA 500 can be IEEE compliant with the following IEEE standards—802.11, 802.11a, 802.11b, 802.11e, 802.11g, 802.11h, 802.11i, and 802.14.

Figure 6:
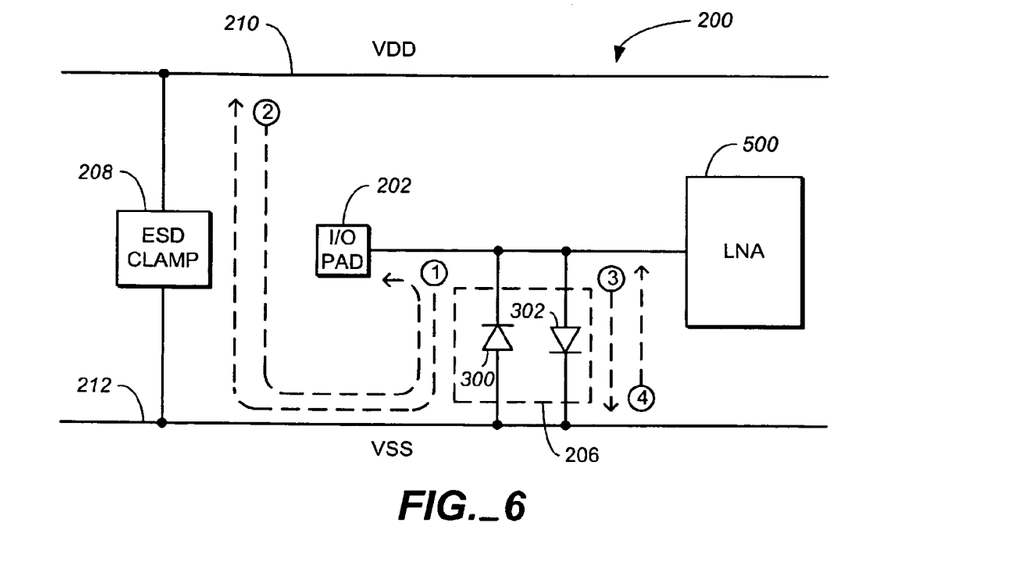
FIG. 6 illustrates an ESD protection circuit for a low noise amplifier.

Referring to FIG. 6, ESD protection circuit 206 is particularly suitable to protect LNA circuits due to LNA circuits having relatively low input voltage swings—(e.g., lower than 0.6V-0.7V). That is, the input voltage swings are low enough such that neither of diodes 300, 302 are activated by the input voltage swings.

Other Implementations

Figure 7:
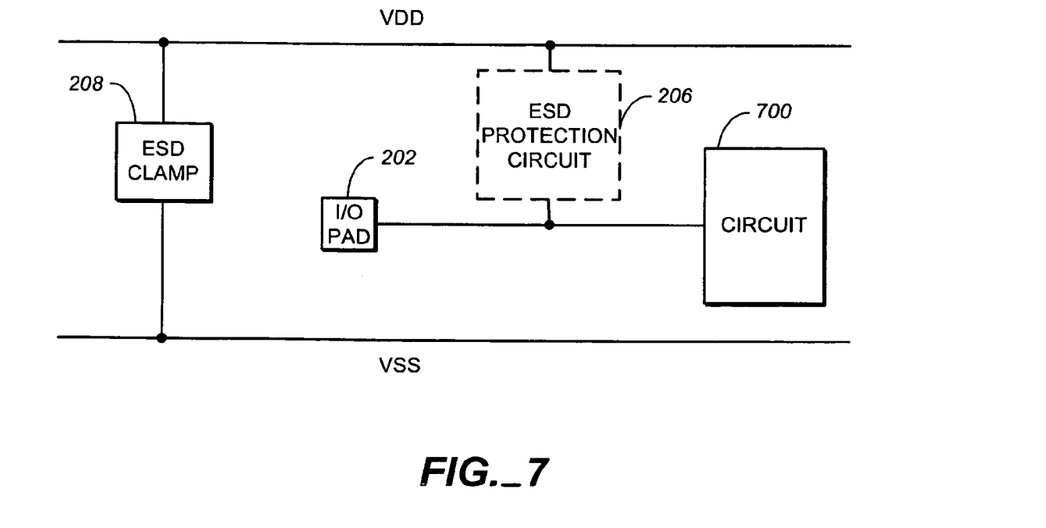
FIG. 7 illustrates an ESD protection scheme for an IC.

An internal circuit can have an input that is referenced to a high-side supply VDD instead of a low-side supply VSS—e.g., the internal circuit can have a p-type input device such as a PMOS transistor or a PNP bipolar transistor. In this case, the ESD protection scheme can be modified as shown in FIG. 7, in which case ESD protection circuit 206 couples an internal circuit 700 (having a p-type input device) to high-side supply VDD instead of low-side supply VSS.

Figure 8:
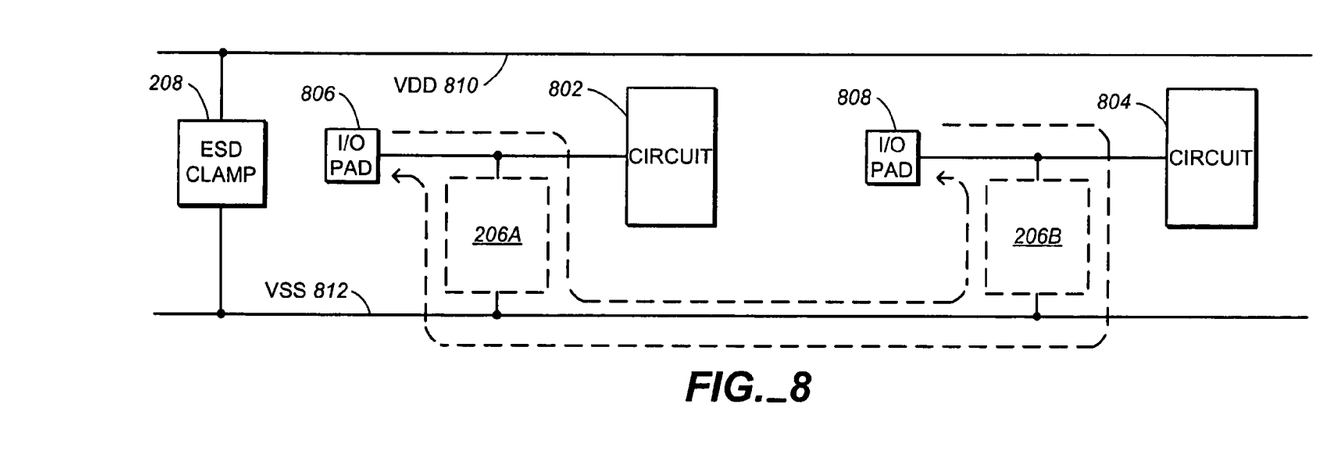
FIG. 8 illustrates an ESD protection scheme for ICs within a single supply group.

FIG. 8 shows an ESD protection scheme including ESD protection circuits 206A, 206B to protect internal circuits 802, 804 (within a single high-side supply group—i.e., VDD 810) against pin-to-pin zapping between I/O pins 806, 808. For example, an I/O pad 806 to I/O pad 808 positive discharge pulse can occur when a positive ESD exerts stress on I/O pad 806 with I/O pad 808 relatively grounded. In such a case, the role of ESD protection circuits 206A, 206B is to shunt the positive ESD away from internal circuits 802, 804. The positive I/O pad 806 to I/O pad 808 positive discharge pulse is shunted away from internal circuits 802, 804 as follows: ESD protection circuit 206A shunts the ESD current from I/O pad 806 to VSS 812. ESD protection circuit 206B shunts the ESD current from VSS 812 to I/O pad 808. A positive discharge pulse from I/O pad 808 to I/O pad 806 can similarly be discharged.

Figure 9:
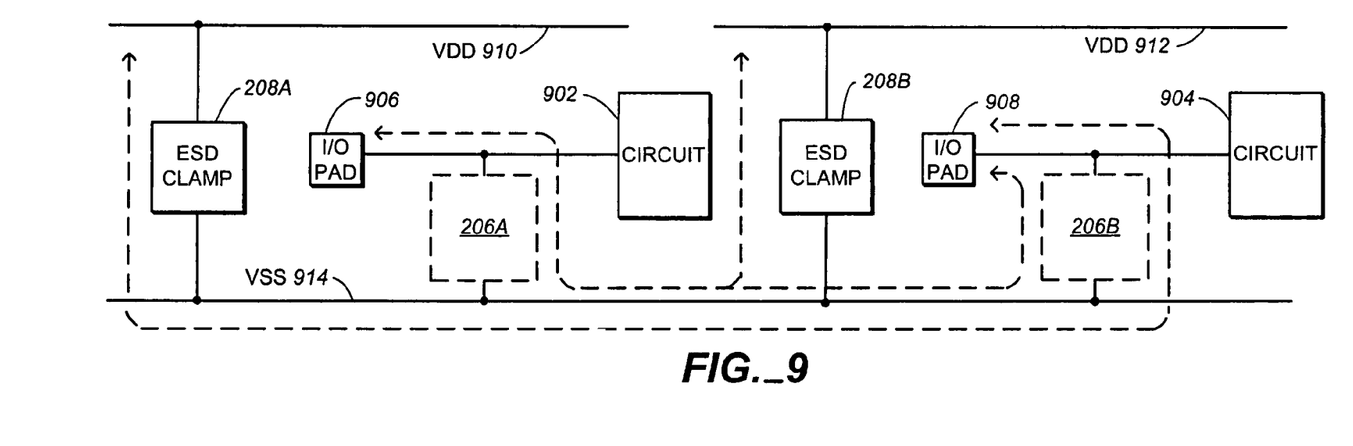
FIG. 9 illustrates an ESD protection scheme for ICs within a different supply group.

FIG. 9 shows an ESD protection scheme including ESD protection circuits 206A, 206B, and ESD clamps 208A, 208B to protect internal circuits 902, 904 (within different high-side supply groups—i.e., VDD 910, 912) against pin-to-pin zapping between I/O pins 906, 908, and PIN to supply zapping. Pin-to-pin zapping between I/O pins 906, 908 can be discharged as discussed above with respect to the ESD protection scheme of FIG. 8.

A number of implementations of the invention have been described. Nevertheless, it will be understood that various modifications may be made. For example, the ESD protection scheme can be used to protect circuits having a low input voltage swing (e.g., lower than 0.6V-0.7V), and a low bias voltage. Also, FIGS. 8 and 9 can have internal circuits that have inputs referenced to a high-side supply VDD instead of a low-side supply VSS. Accordingly, other implementations are within the scope of the following claims.

What is claimed is:

1. A low noise amplifier, comprising:
a radio frequency input;
an electrostatic discharge protection circuit including:
a pair of diodes each having a first and a second terminal;
a first diode of the pair having a first terminal coupled to the radio frequency input and a second terminal directly coupled to a low voltage supply; and
a second diode of the pair having a second terminal coupled to the radio frequency input and a first terminal directly coupled to the low voltage supply; and
an electrostatic discharge clamp directly coupled between a high voltage supply and the low voltage supply so as to provide a discharge path between the high voltage supply and the low voltage supply during an electrostatic discharge event,
wherein the electrostatic discharge protection circuit is operable to float the low voltage supply and to shunt:
the radio frequency input to high voltage supply positive discharge pulse using the second diode and the electrostatic discharge clamp, and
the radio frequency input to high voltage supply negative discharge pulse using the first diode and the electrostatic discharge clamp.

2. The low noise amplifier of claim 1, wherein the first and second diodes are formed by one of polymer devices and metal oxide silicon devices.

3. The low noise amplifier of claim 1, further comprising an additional circuit of the low noise amplifier associated with the radio frequency input wherein:
if the additional circuit is referenced to the low voltage supply, then the electrostatic discharge protection circuit is not directly coupled to the high voltage supply; and
if the additional circuit is referenced to the high voltage supply, then the electrostatic discharge protection circuit is not directly coupled to the low voltage supply.

4. The low noise amplifier of claim 1, wherein the low noise amplifier is compliant with an IEEE standard selected from the group consisting of 802.11, 802.11a, 802.11b, 802.11e, 802.11g, 802.11h, and 802.11i, and 802.14.

5. A low noise amplifier, comprising:
a radio frequency input;
an electrostatic discharge protection circuit including:
a pair of diodes each having a first and a second terminal;
a first diode of the pair having a first terminal coupled to the radio frequency input and a second terminal directly coupled to a low voltage supply; and
a second diode of the pair having a second terminal coupled to the radio frequency input and a first terminal directly coupled to the low voltage supply; and
an electrostatic discharge clamp directly coupled between a high voltage supply and the low voltage supply so as to provide a discharge path between the high voltage supply and the low voltage supply during an electrostatic discharge event,
wherein the electrostatic discharge protection circuit is operable to float the high voltage supply and to shunt:
the radio frequency input to low voltage supply positive discharge pulse using the second diode, and
the radio frequency input to low voltage supply negative discharge pulse using the first diode.

6. The low noise amplifier of claim 5, wherein the first and second diodes are formed by one of polymer devices and metal oxide silicon devices.

7. The low noise amplifier of claim 5, further comprising an additional circuit of the low noise amplifier associated with the radio frequency input wherein:
if the additional circuit is referenced to the low voltage supply, then the electrostatic discharge protection circuit is not directly coupled to the high voltage supply; and
if the additional circuit is referenced to the high voltage supply, then the electrostatic discharge protection circuit is not directly coupled to the low voltage supply.

8. The low noise amplifier of claim 5, wherein the low noise amplifier is compliant with an IEEE standard selected from the group consisting of 802.11, 802.11a, 802.11b, 802.11e, 802.11g, 802.11h, and 802.11i, and 802.14.

9. An electrostatic discharge protection circuit, comprising:
a pair of diodes each having a first and a second terminal;
a first diode of the pair having a first terminal coupled to an input/output pad and a second terminal directly coupled to a low voltage supply; and
a second diode of the pair having a second terminal coupled to the input/output pad and a first terminal directly coupled to the low voltage supply; and
an electrostatic discharge clamp directly coupled between a high voltage supply and the low voltage supply so as to provide a discharge path between the high voltage supply and the low voltage supply during an electrostatic discharge event,
wherein the electrostatic discharge protection circuit is operable to float the low voltage supply and to shunt:
the input/output pad to high voltage supply positive discharge pulse using the second diode and the electrostatic discharge clamp, and
the input/output pad to high voltage supply negative discharge pulse using the first diode and the electrostatic discharge clamp.

10. The circuit of claim 9, wherein the first and second diodes are formed by one of polymer devices and metal oxide silicon devices.

11. The circuit of claim 9, wherein the input/output pad is associated with a separate circuit and:
if the separate circuit is referenced to the low voltage supply, then the electrostatic discharge protection circuit is not directly coupled to the high voltage supply; and
if the separate circuit is referenced to the high voltage supply, then the electrostatic discharge protection circuit is not directly coupled to the low voltage supply.

12. An electrostatic discharge protection circuit, comprising:
a pair of diodes each having a first and a second terminal;
a first diode of the pair having a first terminal coupled to an input/output pad and a second terminal directly coupled to a low voltage supply; and
a second diode of the pair having a second terminal coupled to the input/output pad and a first terminal directly coupled to the low voltage supply; and
an electrostatic discharge clamp directly coupled between a high voltage supply and the low voltage supply so as to provide a discharge path between the high voltage supply and the low voltage supply during an electrostatic discharge event,
wherein the electrostatic discharge protection circuit is operable to float the high voltage supply and to shunt:
an input/output pad to low voltage supply positive discharge pulse using the second diode, and
an input/output pad to low voltage supply negative discharge pulse using the first diode.

13. The circuit of claim 12, wherein the first and second diodes are formed by one of polymer devices and metal oxide silicon devices.

14. The circuit of claim 12, wherein the input/output pad is associated with a separate circuit and:
- if the separate circuit is referenced to the low voltage supply, then the electrostatic discharge protection circuit is not directly coupled to the high voltage supply; and
- if the separate circuit is referenced to the high voltage supply, then the electrostatic discharge protection circuit is not directly coupled to the low voltage supply.

15. A method for discharging electrostatic discharge, comprising:
- providing a first direct discharge path between an input/output pad and a low voltage supply;
- providing a second direct discharge path between the input/output pad and the low voltage supply;
- providing a third discharge path between the low voltage supply and a high voltage supply during an electrostatic discharge event; and
- floating the low voltage supply while
  - shunting an input/output pad to high voltage supply positive discharge pulse using the second direct discharge path and the third discharge path, and
  - shunting an input/output pad to high voltage supply negative discharge pulse using the first direct discharge path and the direct discharge path.

16. The method of claim 15, wherein the input/output pad is associated with a circuit and:
- if the circuit is referenced to the low voltage supply, then not providing a direct discharge path between the input/output pad and the high voltage supply; and
- if the circuit is referenced to the high voltage supply, then not providing a direct discharge path between the input/output pad and the low voltage supply.

17. A method for discharging electrostatic discharge, comprising:
- providing a first direct discharge path between an input/output pad and a low voltage supply;
- providing a second direct discharge path between the input/output pad and the low voltage supply;
- providing a third discharge path between the low voltage supply and a high voltage supply during an electrostatic discharge event; and
- floating the high voltage supply while
  - shunting an input/output pad to low voltage supply positive discharge pulse using the second direct discharge path, and
  - shunting an input/output pad to low voltage supply negative discharge pulse using the first direct discharge path.

18. The method of claim 17, wherein the input/output pad is associated with a circuit and:
- if the circuit is referenced to the low voltage supply, then not providing a direct discharge path between the input/output pad and the high voltage supply; and
- if the circuit is referenced to the high voltage supply, then not providing a direct discharge path between the input/output pad and the low voltage supply.

* * * * *